United States Patent
Lee et al.

(10) Patent No.: US 12,490,120 B2
(45) Date of Patent: Dec. 2, 2025

(54) METHOD AND APPARATUS FOR MACHINE-LEARNING-BASED RESOURCE ALLOCATION IN WIRELESS COMMUNICATION SYSTEM

(71) Applicant: Korea University Research and Business Foundation, Seoul (KR)

(72) Inventors: In Kyu Lee, Seoul (KR); Min Seok Kim, Seoul (KR); Hong Ju Lee, Suwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 27 days.

(21) Appl. No.: 18/272,528

(22) PCT Filed: Aug. 31, 2022

(86) PCT No.: PCT/KR2022/013052
§ 371 (c)(1),
(2) Date: Jul. 14, 2023

(87) PCT Pub. No.: WO2023/128126
PCT Pub. Date: Jul. 6, 2023

(65) Prior Publication Data
US 2024/0323710 A1    Sep. 26, 2024

(30) Foreign Application Priority Data

Jan. 3, 2022  (KR) .................. 10-2022-0000235

(51) Int. Cl.
*H04W 28/06* (2009.01)
*H04W 24/02* (2009.01)
*H04W 72/044* (2023.01)

(52) U.S. Cl.
CPC ........... *H04W 24/02* (2013.01); *H04W 28/06* (2013.01); *H04W 72/044* (2013.01)

(58) Field of Classification Search
CPC ............ G06N 3/08; G06N 20/00; G06N 3/04; H04W 28/06; H04W 24/02; H04W 72/044
See application file for complete search history.

(56) References Cited

U.S. PATENT DOCUMENTS 11,330,378 B1 * 5/2022 Jelčicová ............. H04R 25/407
11,555,706 B1 * 1/2023 Levihn ................ G05D 1/0088
(Continued)

FOREIGN PATENT DOCUMENTS

| KR | 10-2020-0031163 A | 3/2020 |
| KR | 10-2021-0131923 A | 11/2021 |
| KR | 10-2021-0144534 A | 11/2021 |

OTHER PUBLICATIONS

Korean Office Action Issued on Apr. 14, 2025, in Counterpart Korean Patent Application No. 10-2022-0000235 (2 Pages in English, 2 Pages in Korean).

(Continued)

*Primary Examiner* — Syed Ali
(74) *Attorney, Agent, or Firm* — NSIP Law (57) ABSTRACT

The present disclosure relates to a machine learning-based resource allocation method and device in a wireless communication system. A method of performing resource allocation in a wireless communication system according to an embodiment of the present disclosure may include acquiring DNN output information through a deep neural network (DNN) based on input H corresponding to wireless channel-related information; acquiring resource allocation matrix X having a form of a permutation matrix through an approximation operation to a doubly stochastic matrix based on input A corresponding to the DNN output information; and allocating M resource elements belonging to a set of first type resources to N resource elements belonging to a set of second type resources based on the resource allocation matrix.

11 Claims, 6 Drawing Sheets

(56) References Cited

U.S. PATENT DOCUMENTS

| | | | | |
|---|---|---|---|---|
| 2003/0227901 | A1* | 12/2003 | Kodialam | H04L 47/56 370/351 |
| 2005/0226214 | A1* | 10/2005 | Keslassy | H04L 47/10 370/351 |
| 2022/0083855 | A1* | 3/2022 | Choi | G06F 17/18 |
| 2024/0235646 | A1* | 7/2024 | Lee | H04B 7/0478 |

OTHER PUBLICATIONS

Guo et al. "Predictive Resource Allocation with Deep Learning", *2018 IEEE 88th Vehicular Technology Conference (VTC-Fall)*. Aug. 1, 2018 (pp. 1-7).

Ahmed et al. "Deep Learning for Radio Resource Allocation in Multi-Cell Networks", arXiv:1808.00667v1. Aug. 2, 2018 (pp. 1-15).

Liang et al. "Deep Learning based Wireless Resource Allocation with Application to Vehicular Networks", *Proceedings of the IEEE* vol. 108 No. 2. Oct. 1, 2019 (pp. 1-14).

Eisen et al. "Learning Optimal Resource Allocations In Wireless Systems", *EEE Transactions on Signal Processing* vol. 67 No. 10, 2019 (pp. 1-139).

Yang et al. "Deep Neural Network for Resource Management in NOMA Networks", *IEEE Transactions on Vehicular Technology*, vol. 69, No. 1, Jan. 2020 (pp. 876-886).

Kim et al. "Deep Learning Based Resource Assignment for Wireless Networks", *IEEE Communications Letters* vol. 25 No. 12. Sep. 27, 2021 (pp. 1-5).

* cited by examiner

METHOD AND APPARATUS FOR MACHINE-LEARNING-BASED RESOURCE ALLOCATION IN WIRELESS COMMUNICATION SYSTEM

CROSS REFERENCE TO RELATED APPLICATIONS

This application is a U.S. National Stage Application of International Application No. PCT/KR2022/013052, filed on Aug. 31, 2022, which claims the benefit under 35 USC 119 (a) and 365(b) of Korean Patent Application No. 10-2022-0000235, filed on Jan. 3, 2022, in the Korean Intellectual Property Office, the entire disclosure of which is incorporated herein by reference for all purposes.

TECHNICAL FIELD

In a wireless communication system, a network node performing communication (e.g., a base station, a terminal, a relay, etc.) and a radio resource used for communication (e.g., a time domain resource, a frequency domain resource, a code domain resource, etc.) are limited. In order to derive the maximum performance of a wireless communication system, it is important to allocate limited resources (e.g., a network node and/or a radio resource) efficiently/optimally.

BACKGROUND ART

In a wireless communication system, a network node performing communication (e.g., a base station, a terminal, a relay, etc.) and a radio resource used for communication (e.g., a time domain resource, a frequency domain resource, a code domain resource, etc.) are limited. In order to derive the maximum performance of a wireless communication system, it is important to allocate limited resources (e.g., a network node and/or a radio resource) efficiently/optimally.

As an allocation problem is a problem which analyzes a method of optimally allocating two different objects, it is shown in a variety of networking scenarios. In order to solve an allocation problem, there are lots of algorithms which guarantee the existing excellent performance, but there is a disadvantage that it is difficult to access a problem having high computational complexity and a nonlinear objective function. Specifically, the Hungarian algorithm guarantees the optimal performance for a linear sum allocation problem, but it entails high computational complexity for executing repetitive calculation. In addition, a solver for mixed integer programs can solve only an allocation problem having a convex function as an objective function and has high computational complexity due to repetitive calculation.

Recently, a deep learning-based optimization method is considered as a promising technology for reducing computational complexity. Supervised learning which is trained to memorize a solution obtained by the existing optimization technique may obtain performance which is close to be optimal while reducing execution time, but requires a process of collecting learning data with the existing algorithm. In order to solve it, a concept of unsupervised learning appeared and demonstrated efficiency for multiple non-convex function problems.

Studies on a deep learning-based algorithm having low complexity for an allocation problem have been conducted and specifically, there has been a study to learn a solution of the Hungarian algorithm for a linear sum allocation problem through supervised learning. A problem may be solved by dividing an allocation problem into multiple subproblems and configuring each subproblem with a deep neural network (DNN) to learn an optimal solution of the Hungarian algorithm. But, this supervised learning method always requires a post-processing process to obtain a reasonable solution, resulting in loss in performance. Accordingly, in order to solve an allocation method, a new deep learning structure with low complexity is required.

DISCLOSURE

Technical Problem

A technical problem of the present disclosure provides a new method and device which may improve communication quality by deriving efficient resource allocation even with lower complexity than the existing method, while applying a deep learning technique for optimal allocation of resources in a wireless communication system.

An additional technical problem of the present disclosure, for resource allocation in a wireless communication system, provides a method and a device of applying a binary variable learning method which solves a gradient loss problem in the existing deep learning.

An additional technical problem of the present disclosure, for resource allocation in a wireless communication system, provides a new method and device of converting a problem entailing a selection process that a gradient does not exist into a problem that the existing gradient-based training algorithm is applicable through a new activation function to which a Sinkhorn operation is applied.

The technical objects to be achieved by the present disclosure are not limited to the above-described technical objects, and other technical objects which are not described herein will be clearly understood by those skilled in the pertinent art from the following description.

Technical Solution

A method of performing resource allocation in a wireless communication system according to an aspect of the present disclosure may include acquiring DNN output information through a deep neural network (DNN) based on input H corresponding to wireless channel-related information; acquiring resource allocation matrix X having a form of a permutation matrix through an approximation operation to a doubly stochastic matrix based on input A corresponding to the DNN output information; and allocating M resource elements belonging to a set of first type resources to N resource elements belonging to a set of second type resources based on the resource allocation matrix.

A device of performing resource allocation in a wireless communication system according to an additional aspect of the present disclosure includes a memory; and a processor, and the processor may be configured to acquire DNN output information through a deep neural network (DNN) based on input H corresponding to wireless channel-related information; acquire resource allocation matrix X having a form of a permutation matrix through an approximation operation to a doubly stochastic matrix based on input A corresponding to the DNN output information; and allocate M resource elements belonging to a set of first type resources to N resource elements belonging to a set of second type resources based on the resource allocation matrix.

The characteristics which are simply summarized above for the present disclosure are just an illustrative aspect of a detailed description of the after-described present disclosure and do not limit a scope of the present disclosure.

Technical Effects

According to the present disclosure, a new method and device which may improve communication quality by deriving efficient resource allocation even with lower complexity than the existing method while applying a deep learning technique for optimal allocation of resources in a wireless communication system may be provided.

According to the present disclosure, for resource allocation in a wireless communication system, a method and a device of applying a binary variable learning method which solves a gradient loss problem in the existing deep learning may be provided.

According to the present disclosure, for resource allocation in a wireless communication system, a new method and device of converting a problem entailing a selection process that a gradient does not exist into a problem that the existing gradient-based training algorithm is applicable through a new activation function to which a Sinkhorn operation is applied may be provided.

Effects achievable by the present disclosure are not limited to the above-described effects, and other effects which are not described herein may be clearly understood by those skilled in the pertinent art from the following description.

DESCRIPTION OF DIAGRAMS

BEST MODE

Hereinafter, an embodiment of the present disclosure will be described in detail so that those skilled in the pertinent art from the following description can easily carry it out by referring to an attached diagram. However, the present disclosure may be implemented in a variety of different forms and is not limited to an embodiment which is described herein.

In describing an embodiment of the present disclosure, when it is determined that a detailed description on a disclosure configuration or function could cloud a gist of the present disclosure, a detailed description thereon is omitted. In addition, a part irrelevant to a description on the present disclosure in a diagram is omitted and a similar diagram code is attached to a similar part.

In the present disclosure, when an element is referred to as being "connected", "combined" or "linked" to another element, it may include an indirect connection relation that yet another element presents therebetween as well as a direct connection relation. In addition, when an element is referred to as "including" or "having" another element, it means that another element may be additionally included without excluding another element unless otherwise specified.

In the present disclosure, a term such as first, second, etc. is used only to distinguish one element from other element and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

In the present disclosure, elements which are distinguished each other are to clearly describe each characteristic and do not mean that elements must be separated. In other words, a plurality of elements may be combined and configured in a unit of one hardware or software and one element may be distributed and configured in a unit of a plurality of hardware or software. Accordingly, even if separately mentioned, such a combined or distributed embodiment is also included in a scope of the present disclosure.

In the present disclosure, elements described in a variety of embodiments do not necessarily mean essential elements and some may be a selective element. Accordingly, an embodiment configured with a subset of elements described in an embodiment is also included in a scope of the present disclosure. In addition, an embodiment which additionally includes other element in elements described in a variety of embodiments is also included in a scope of the present disclosure.

The present disclosure is about a communication between network nodes in a wireless communication system. A network node may include at least one of a base station, a terminal or a relay. A term of a base station (BS) may be substituted with a term such as a fixed station, a Node B, an eNodeB (eNB), a ng-eNB, a gNodeB (gNB), an Access Point (AP), etc. A terminal may be substituted with a term such as UE (User Equipment), a MS (Mobile Station), a MSS (Mobile Subscriber Station), a SS (Subscriber Station), a non-AP station (non-AP STA), etc.

A wireless communication system may support a communication between a base station and a terminal and may support a communication between terminals. In a communication between a base station and a terminal, a downlink (DL) means a communication from a base station to a terminal. An uplink (UL) means a communication from a terminal to a base station. A communication between terminals may include a variety of communication methods or services such as D2D (Device-to-Device), V2X (Vehicle-to-everything), ProSe (Proximity Service), a sidelink communication, etc. In a communication between terminals, a terminal may be implemented in a form of a sensor node, a vehicle, a disaster alarm, etc.

In addition, the embodiments of the present disclosure may be applied to a wireless communication system including a relay or a relay node (RN). When a relay is applied to a communication between a base station and a terminal, a relay may function as a base station for a terminal and a relay may function as a terminal for a base station. Meanwhile, when a relay is applied to a communication between terminals, a relay may function as a base station for each terminal.

The present disclosure may be applied to a variety of multi access methods of a wireless communication system. For example, a multi access method may include CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, NOMA (Non-Orthogonal Multiple Access), etc. In addition, a wireless communication system to which the present disclosure may be applied may support a TDD (Time Division Duplex) method which uses a time resource that uplink and downlink communications are distinguished each other or may support a FDD (Frequency Division Duplex) method which uses frequency resources which are distinguished each other.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, examples of the present disclosure for resource allocation in a wireless communication system are described.

In the following examples, "resource" in a wireless communication system is used as a general term for a network node (e.g., a base station, a terminal, a relay, etc.) and a radio resource (e.g., a time domain resource, a frequency domain resource, a code domain resource, etc.).

The present disclosure covers an allocation problem which matches a resource in set M={1, . . . , M} to a resource in set N={1, . . . , N}. In other words, M corresponds to the number of first type resources belonging to set M and N corresponds to the number of second type resources belonging to set N. A type of a resource belonging to set M (i.e., a first type) and a type of a resource belonging to set N (i.e., a second type) may be the same or different. For example, a first type resource may be one of a base station, a terminal or a resource block and a second type resource may correspond to a resource of the remaining types except for a first type resource.

Hereinafter, a symmetric allocation problem with N=M is described first, and a general asymmetric allocation problem with N>M (or N<M) is described later. A goal of a symmetric allocation problem is to find an optimal one-to-one matching strategy between resources. A constraint of a symmetric allocation problem may be shown as in the following Equation.

$$\sum_{i=1}^{N} x_{ij} = 1, \forall j, \text{ and } \sum_{j=1}^{N} x_{ij} = 1, \forall i \quad \text{[Equation 1]}$$

In Equation 1, a symmetric allocation problem (i.e., M=N) is assumed as described above. In Equation 1, $x_{ij}$ (i∈M, j∈N) corresponds to a binary optimization variable or a discrete allocation variable having a value of 0 or 1.

In other words, if $x_{ij}$ is 1, it means that a i-th first type resource is allocated to a j-th second type resource and if $x_{ij}$ is 0, it means that a i-th first type resource is not allocated to a j-th second type resource. In addition, allocation or matching between a first type resource and a second type resource may have a one-to-one relationship (i.e., each first type resource may be allocated only to one second type resource).

X in Equation 2 represents an allocation matrix composed of $x_{ij}$ in Equation 1 and according to definition of Equation 2, X has a form of a permutation matrix.

$$X \triangleq \{x_{ij}, \forall i, j\} \in \{0, 1\}^{N \times N} \quad \text{[Equation 2]}$$

Next, a radio wave environment (or radio channel information) given in the above-described allocation problem corresponds to input and such an input matrix may be defined as H as in Equation 3.

$$H \triangleq \{h_{ij}, \forall i, j\} \in \mathbb{R}^{N \times N} \quad \text{[Equation 3]}$$

In Equation 3, $h_{ij}$ may correspond to a connection state (or radio channel related information) between a i-th first type resource and a j-th second type resource.

As a value determining a cost for allocation, a general cost function may be defined as f(X,H) and accordingly, the above-described allocation problem may be defined as in the following Equation.

$$\min_{X \in P_N} f(X, H) \quad \text{[Equation 4]}$$

In Equation 4, $P_N$ refers to a set of all N×N-sized permutation matrixes. If a cost function f(X,H) is a convex function, it may be solved with a variety of algorithms and solvers, but if it is a non-convex function, it may not be solved in a general way. In a general situation including a case in which a cost function f(X,H) is a non-convex function, examples of the present disclosure for efficiently obtaining X corresponding to an allocation matrix are described below.

In the present disclosure, a deep neural network (DNN) model may be applied as an example of a machine learning technique. But, a scope of the present disclosure is not limited to a DNN model, and a principle of the present disclosure may be also applied equally to other similar machine learning technique.

As a DNN is a structure created in computer science by imitating a human neural network structure, it is a model composed of multiple layers acting as a human neuron. An intermediate layer excluding an input and output layer is referred to as a hidden layer, and output which may be obtained through a deep neural network composed of a total of R layers may be shown as in the following Equation.

$$\mathcal{F}(vec(H); \theta) = \sigma_R(W_R \times \ldots \times \sigma_1(W_1 vec(H) + b_1) + \ldots + b_R) \quad \text{[Equation 5]}$$

$W_r$ refers to a weight of a r-th hidden layer. $b_r$ refers to a bias of a r-th hidden layer. $\sigma_r$ refers to a nonlinear activation function. In other words, output of a r-th layer may be expressed as output of an activation function which uses as input a value obtained by applying a weight of a r-th layer to output of a r−1-th layer and adding a bias of a r-th layer to a result to which a weight is applied. A DNN model including multiple layers and multiple nonlinear activation functions may be used to approximate a nonlinear relationship between input and output which is difficult to show mathematically and accordingly, solve a problem which is difficult to solve theoretically. In Equation 5, all weights and biases configuring a neural network may be defined as θ={$W_r, b_r, \forall r$}.

In a neural network training step, learning is conducted in a direction of minimizing a cost function f(X,H). But, with a general deep neural network learning method, it is difficult to learn by converging output into a permutation matrix. In order to solve it, in the present disclosure, examples of applying a new activation function are described.

When an input vector of a final activation function of a deep neural network is referred to as a and reshaping it into a N×N-sized matrix is referred to as A, it may be expressed as $X=\sigma_R(A)$. Accordingly, only when the following Equation should be satisfied, a solution of an allocation problem may be derived.

$$\sigma_R(A) \triangleq \arg\max_{X \in \mathcal{P}_N} tr(A^T X) \qquad \text{[Equation 6]}$$

Since Equation 6 entails a selection process in which a gradient for A does not exist due to a combination characteristic, it is difficult to learn or solve when a gradient-based training algorithm of the existing deep learning is used.

In order to solve it, the present disclosure includes an example of modifying or improving an operation which performs approximation to a doubly stochastic matrix, continuous relaxation of a permutation matrix. The operation, for example, may be referred to as a Sinkhorn operation and in the present disclosure, a resource allocation problem may be solved through a modified or improved example of a Sinkhorn operation.

Specifically, a permutation matrix may not be derived through the existing Sinkhorn operation. According to the present disclosure, a new solution using a modified Sinkhorn operation which applies a predetermined factor (e.g., a constant corresponding to a degree of approximation) to input of a Sinkhorn operation may be applied.

In addition, a modified Sinkhorn operation according to the present disclosure may be defined as having the limited number of repetitions. Accordingly, a modified Sinkhorn operation may be repetitively applied to acquire an activation function of a last layer.

Among the existing allocation problem solutions, the Hungarian algorithm operates only when a cost function has an affine form and a supervised learning method may not always obtain an optimal solution, so there is a problem that a post-processing process is required. In addition, the existing Sinkhorn operation makes a doubly stochastic matrix to project it to a close permutation matrix, so there is a problem that a permutation matrix may not be directly derived. Contrary to it, according to examples of the present disclosure, it may learn without learning data, may be also applied to a non-convex function and may directly derive a permutation matrix by modifying or improving Sinkhorn. Accordingly, examples of the present disclosure may provide a learnable module with other neural network and may be also applied to a resource allocation problem in any system as well as resource allocation in a wireless communication system.

As a specific example, when a doubly stochastic matrix is referred to as D, elements of D have a property as in the following Equation.

$$\sum_{i=1}^{n} d_{ij} = 1, \sum_{j=1}^{n} d_{ij} = 1, 0 \le d_{ij} \le 1 \qquad \text{[Equation 7]}$$

Accordingly, Equation 6 may be modified as in Equation 8.

$$S(A) = \arg\max_{D \in \mathcal{D}_n} tr(A^T D) \qquad \text{[Equation 8]}$$

In Equation 8, $D_n$ refers to a set of all n×n-sized doubly stochastic matrixes. In addition, tr( ) refers to a diagonal sum. S( ) refers to a Sinkhorn operation and in order to define it, row-wise normalization and column-wise normalization may be defined respectively as R(A) and C(A) as in the following Equation.

$$R(A) \triangleq \{\tilde{a}_{ij}, \forall i, j\}, \tilde{a}_{ij} = \frac{a_{ij}}{\sum_{k=1}^{n} a_{ik}}, \qquad \text{[Equation 9]}$$

$$C(A) \triangleq \{\hat{a}_{ij}, \forall i, j\}, \hat{a}_{ij} = \frac{a_{ij}}{\sum_{k=1}^{n} a_{kj}}$$

A Sinkhorn operation is executed by multiplying an exponential function and repeating row-wise normalization and column-wise normalization to prevent a negative value. It may be shown as in the following Equation.

$$S^0(A) \triangleq \exp(A), \ S^m(A) = C(R(S^{m-1}(A))) \qquad \text{[Equation 10]}$$

In Equation 10, m refers to the number of repetitions of an operation. If m converges to infinity, it is known to converge to an optimal solution of Equation 10. But, it is substantially impossible to repeat the infinite number of times. Accordingly, in order to increase convergence speed, a constant corresponding to an approximation degree (hereinafter, defined as τ) may be multiplied by any matrix A to use a property of a softmax function expressed in the following Equation.

$$\text{softmax}(i, z_j, \tau) = \frac{\exp(\tau z_i)}{\sum_{j \ne i} \exp(\tau z_j)} \qquad \text{[Equation 11]}$$

In Equation 11, as a value of τ gets larger, a result value converges to an one-hot vector. An one-hot vector corresponds to a vector selecting one of multiple candidates, and for example, elements of an one-hot vector may be expressed as [0, 0, . . . , 1, 0, 0, . . . , 0]. In other words, $2^B$ elements configuring a vector of a $2^B$ length may be configured with 1 1 and $2^B-1$ 0.

In reference to Equation 10 and Equation 11, S(τA) becomes an operation which repetitively applies a softmax function of Equation 11 in a row direction and in a column direction. Accordingly, an optimal solution of Equation 6 may be effectively solved. Here, for τ, a constant for an approximation degree, as its value increases, output approximates to a permutation matrix, but it may interfere with gradient-based learning of a deep learning network and as its value decreases, an approximation degree to a permutation matrix is lower, but it may help gradient-based learning. Accordingly, τ may be selected as a proper value by considering system requirements.

In addition to or separately from applying approximation degree constant τ as described above, according to an example of the present disclosure, the limited number of repetitions may be applied to a Sinkhorn operation for faster and more accurate convergence.

Specifically, a Sinkhorn operation is consecutively performed K times and each operation is repeated L/K times (i.e., the number of internal operations of a Sinkhorn operation=L/K), so it may become an operation having a total of L repetitions. Here, K is an integer exceeding 0, L is an integer exceeding 0 and K and L may be the same or different.

A solution of an allocation problem may be learned without gradient loss by utilizing an operation defined in this way as an activation function of a last layer of a deep neural network. As a result, it is substituted with X=F(h;θ), and neural network learning may be performed in a direction of optimizing the following Equation (or finding a solution of the following Equation).

$$\min_\theta f(\mathcal{F}(h;\theta), H) \qquad \text{[Equation 12]}$$

A deep neural network according to the present disclosure as described above may always obtain output in a permutation matrix form, so an optimization allocation problem may be solved without a condition of $X \in P_N$ (or $F(h;\theta) \in P_N$) in Equation 6.

When comparing Equation 4 and Equation 12, an optimization variable is changed from X (i.e., an allocation matrix) to θ (i.e., a set of neural network parameters) and it may be solved by using a gradient-based learning method. In other words, an optimization allocation problem may be solved as in the following Equation.

$$\theta \leftarrow \theta - \frac{\eta}{|B|} \sum_{H \in \mathcal{B}} \nabla f(\mathcal{F}(h;\theta), H) \qquad \text{[Equation 13]}$$

In Equation 13, η refers to a rate of descent and B refers to a set of learning data. Neural network parameters may be updated by repeating the above-described process.

Figure 1:
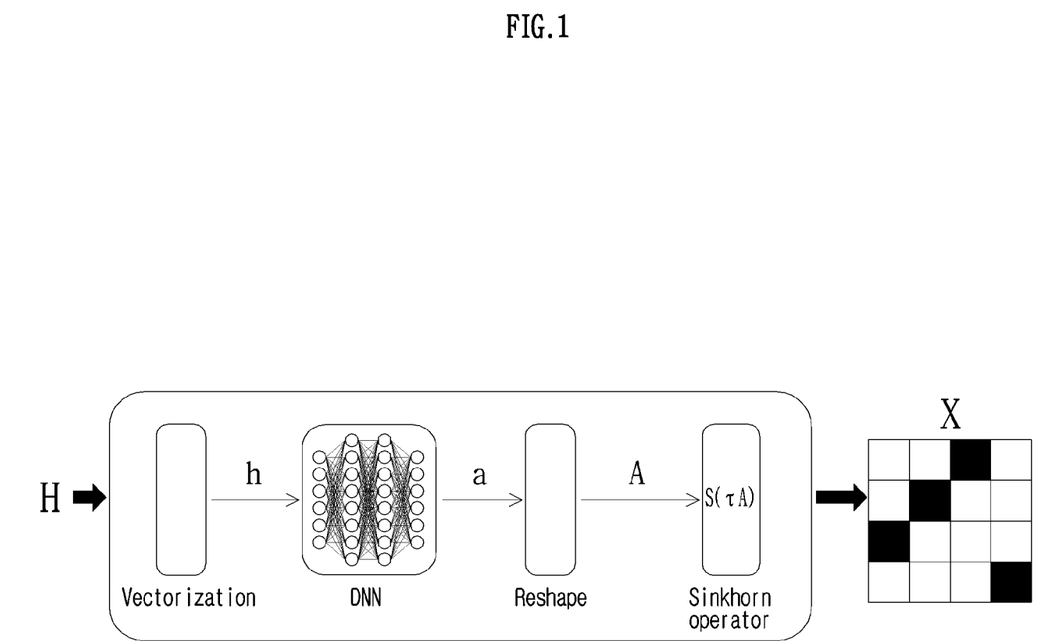
FIG. 1 is a diagram for describing a structure of a neural network according to an example of the present disclosure.

FIG. 1 is a diagram for describing a structure of a neural network according to an example of the present disclosure.

As described above, vector h may be input to a deep neural network (DNN) through vectorization for input matrix H. A DNN may be configured with hidden layers right before a final activation function. In other words, output vector a of a DNN corresponds to an input vector of a final activation function, and it may be input to a modified Sinkhorn operation function (i.e., S(τA)) corresponding to a final activation function by reshaping vector a into N×N-sized matrix A. As a result, X may be directly derived in a form of a permutation matrix.

Figure 2:
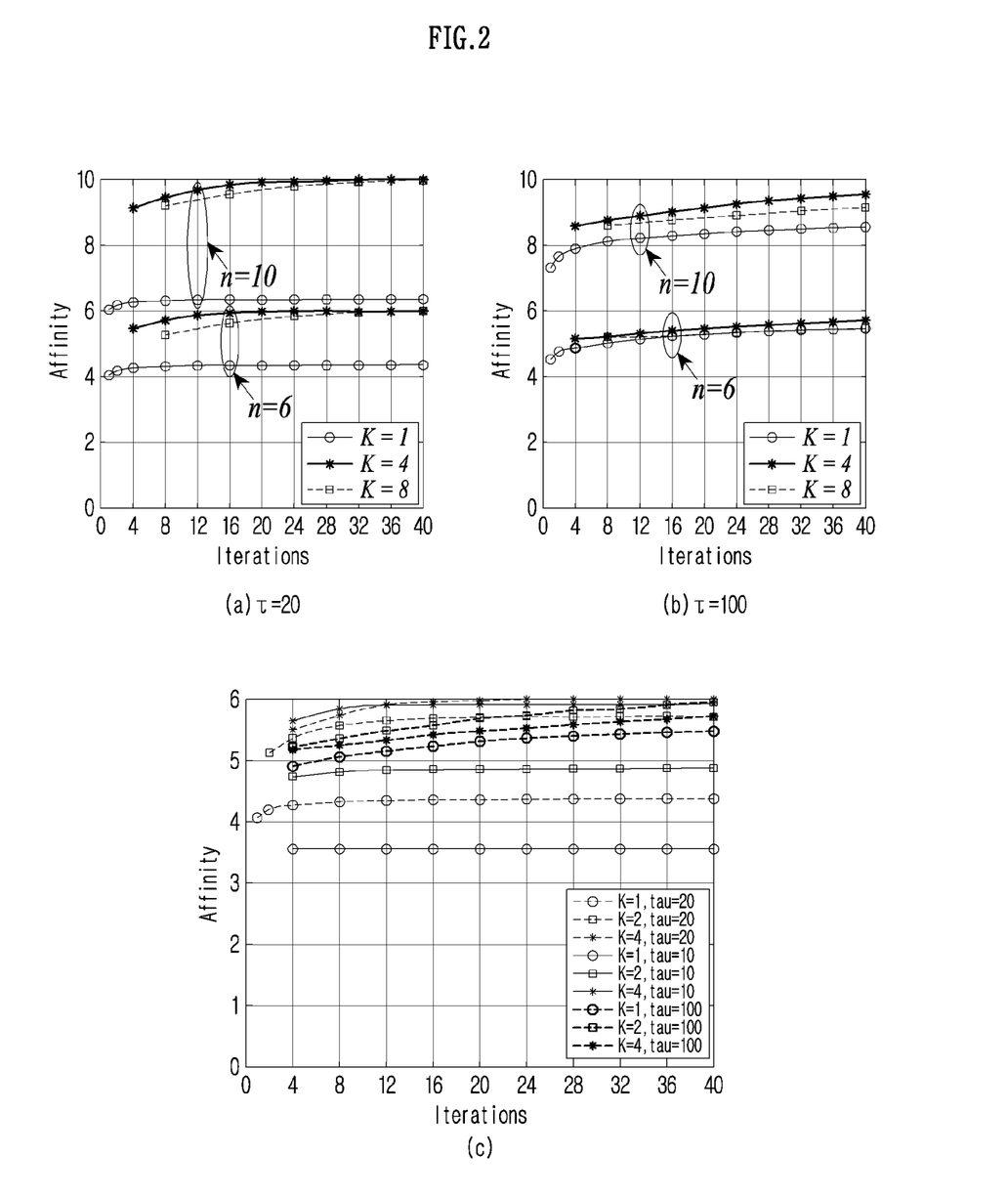
FIG. 2 is a diagram representing a variety of results of applying an approximation degree and the number of repetitions according to an example of the present disclosure.

FIG. 2 is a diagram representing a variety of results of applying an approximation degree and the number of repetitions according to an example of the present disclosure.

FIG. 2 compares and represents a different effect of τ and K. FIG. 2(a) represents a case of τ=20 and FIG. 2(b) represents a case of τ=100. Each of FIG. 2(a) and FIG. 2(b) shows a combination of a case in which the number of consecutive operations of a modified Sinkhorn operation K is 1, 4, or 8 and a case in which the number of allocated resources (i.e., n) is 6 or 10. In FIG. 2(c), a combination of a case in which K is 1, 2, or 4 and a case in which a value of τ (i.e., tau) 20, 10, or 100, are shown.

As shown, it may be seen that as a value of an approximation degree (τ) increases and the number of consecutive operations (K) increases, optimization of an allocation problem is performed even at L, the low number of repetitions.

Examples in which a modified Sinkhorn operation according to the present disclosure is applied to asymmetric allocation, not the above-described symmetric allocation problem, are described below.

Even for an asymmetric allocation problem when the number of elements of a set of first type resources (M) and the number of elements of a set of second type resources (N) are different (N<M or N>M), which is the above-described general situation, output of a neural network according to the present disclosure may be derived in a permutation matrix form.

For an asymmetric allocation problem, Equation 1, a constraint on allocation, may be modified as follows.

$$\sum_{i=1}^{N} x_{ij} = 1, \forall j, \text{ and } \sum_{j=1}^{M} x_{ij} \leq 1, \forall i \qquad \text{[Equation 14]}$$

Such an asymmetric allocation problem may be simply solved by being modified to a matrix x̃ excluding N−M (or M−N) columns of the existing output matrix X of a neural network. In other words, a deep neural network may output a N×N-sized permutation matrix by utilizing a non-square matrix H as input. If learning by calculating a cost function excluding N−M columns from this output matrix, an asymmetric allocation problem may be effectively solved while satisfying a constraint of Equation 14.

Previously, meaningless dummy values had to be put into an input matrix and converted into a square matrix, but according to the present disclosure, an optimal solution may be derived from input of a non-square matrix without the need of a process of inputting a dummy value.

The existing Hungarian algorithm operates only for a problem having a cost function of $f(X,H)=\text{tr}(H^T X)$, a deep learning-based allocation technique is also learned to remember a solution obtained by the Hungarian algorithm and it is impossible to output a form of a permutation matrix all the time, so there is a problem that an additional post-processing process is required. In addition, a Sinkhorn operation has not been applied to resource allocation of a wireless communication system and has been used only in a form of making a proper doubly stochastic matrix and projecting it on the closest permutation matrix.

Unlike a form of supervised learning or reinforcement learning that the existing deep learning resource allocation technique requires learning data collected through an optimization technique, etc., the above-described examples of the present disclosure is based on unsupervised learning, so they may be applied to a general allocation problem that a solution is unknown and may be learned without learning data. In addition, according to the present disclosure, a Sinkhorn operation may be modified/improved into a form optimized for deep learning to provide a new activation function which may always derive a permutation matrix with faster convergence performance. In addition, examples of the present disclosure may be also applied to an example like multi-task learning by providing a deep neural network module capable of learning with other neural network. In other words, examples of the present disclosure has faster and wider applicability than the existing algorithm and may be also applied to a problem having a complicated cost function which may not be solved by the existing algorithm, and resource allocation in a wireless communication system may be performed by low delay through the limited number of repetitions compared to the large number of repetitions of the existing algorithm.

Specifically, it is described by using a linear sum allocation problem as an example.

A linear sum allocation problem is the most representative problem of an allocation problem that a cost function is in a linear sum form with $f(X,H)=tr(H^T X)$ in Equation 4. Table 1 represents a result of comparing the existing supervised learning method and an example (proposed) of the present disclosure for how much performance degradation (i.e., average performance degradation of a cost function) occurs compared to an optimal solution.

TABLE 1

| (M, N)     | (4, 4) | (8, 8) | (2, 4) | (4, 8) |
|------------|--------|--------|--------|--------|
| Proposed   | 0.27%  | 0.85%  | 0.17%  | 0.62%  |
| Supervised | 1.71%  | 22.65% | 1.78%  | 23.23% |

Table 1 represents that a method proposed in the present disclosure is improved in terms of allocation accuracy compared to the existing supervised learning technique. In addition, compared to the Hungarian algorithm which may obtain an optimal solution, examples of the present disclosure showed about 65 times faster CPU time.

Next, application of examples of the present disclosure to terminal allocation and transmission power optimization in a heterogeneous network is described.

Figure 3:
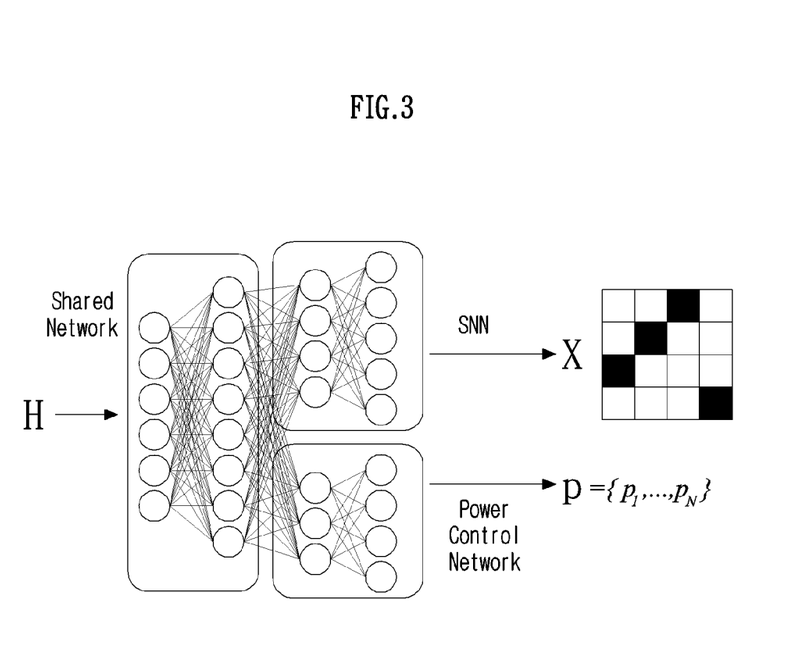
FIG. 3 represents an example of a neural network structure to which the present disclosure may be applied.

FIG. 3 represents an example of a neural network structure to which the present disclosure may be applied.

In a wireless communication system which includes N terminals and N base station having a single antenna, it is assumed that each base station may support only 1 terminal. In FIG. 3, a neural network according to an example of the present disclosure is indicated by a SNN (Sinkhorn neural network) technique. A shared network which uses a SNN to determine allocation X between a base station and a terminal and determines transmission power p through a separate deep neural network together with it may be configured.

A problem of maximizing a rate of an entire system by simultaneously determining transmission power and resource allocation may be represented as in the following Equation.

$$r_{ij}(p) = \log\left(1 + \frac{p_i h_{ij}}{\sigma^2 + \sum_{k \neq 1} p_k h_{kj}}\right), \quad \text{[Equation 15]}$$

$$\sum_{j=1}^{n}\sum_{i=1}^{n} x_{ij} r_{ij}(p), \text{ s.t. } p_i \in [0, P_i], \forall i$$

$P \triangleq \{p_j, \forall j\}$ refers to transmission power of a base station and $\sigma_2$ refers to power of a noise.

It is assumed that a first base station is a macro cell base station and is positioned at the center of a radius 1 km and that the remaining base stations are a small cell base station and are deployed at a distance of 500 m from a macro base station. Terminals are randomly positioned excluding a radius 10 m of a base station, a gradient loss model is $120.9+37.6 \log_{10} d$ [dB], d is a distance between a base station and a terminal and a small-scale fading model borrows a rayleigh fading model. It is assumed that $\sigma^2$ is −114 dBm.

Figure 4:
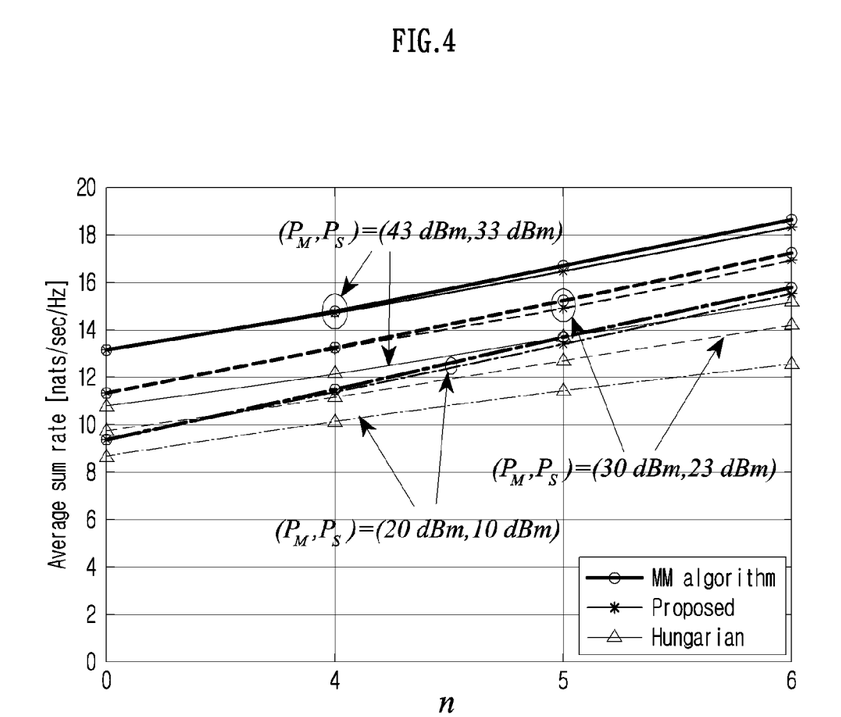
FIG. 4 is a diagram representing a simulation result according to an example of the present disclosure.

FIG. 4 is a diagram representing a simulation result according to an example of the present disclosure.

In FIG. 4, $P_M$ and $P_S$ represent a power budget of a macro cell base station and a small cell base station in the above-described assumption, respectively. FIG. 4 represents that examples (proposed) of the present disclosure show almost the same performance as the existing majorization-minimization (MM) algorithm and show higher performance than the Hungarian technique.

In addition, Table 2 represents that examples of the present disclosure have much less computational complexity through a result of measuring a CPU computation time of 10000 samples in seconds.

TABLE 2

|              | N = 3        |              | N = 6         |               |
|--------------|--------------|--------------|---------------|---------------|
| $(P_M, P_S)$ | (20, 10)     | (43, 33)     | (20, 10)      | (43, 33)      |
| MM           | $4.37 * 10^3$ | $4.89 * 10^3$ | $1.43 * 10^4$ | $1.94 * 10^4$ |
| Hungarian    | $7.27 * 10$   | $1.17 * 10^2$ | $1.21 * 10^2$ | $2.50 * 10^2$ |
| Proposed     | 5.19         |              | 6.11          |               |

Figure 5:
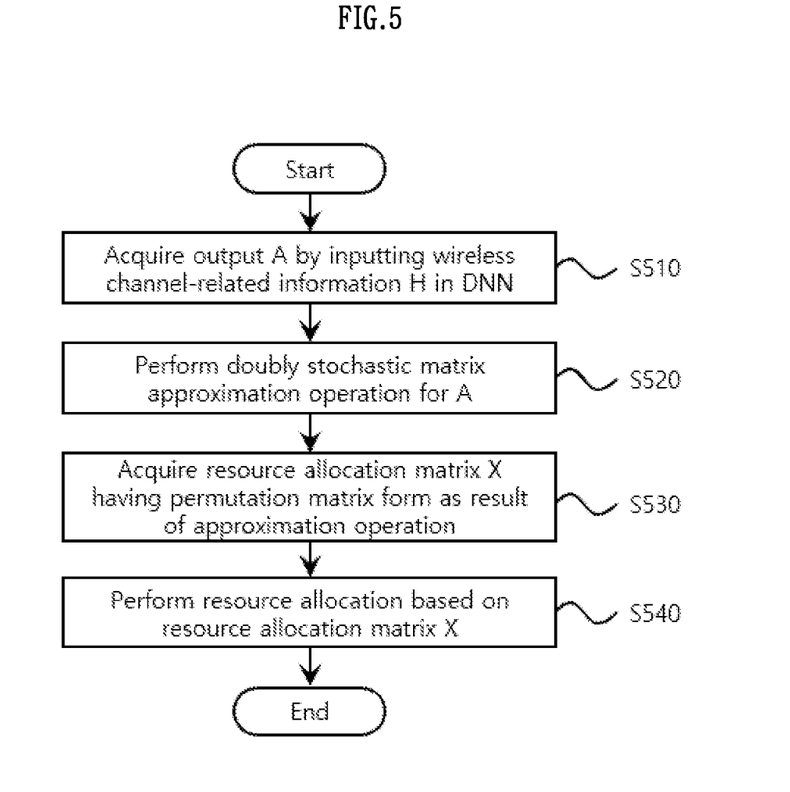
FIG. 5 is a diagram for describing a resource allocation method according to an example of the present disclosure.

FIG. 5 is a diagram for describing a resource allocation method according to an example of the present disclosure.

In S510, matrix H corresponding to wireless channel-related information may be input to a DNN to acquire output A. Output of a DNN may be vector a and vector a may be reconfigured in a matrix form to acquire A.

In S520, a doubly stochastic matrix approximation operation for A may be performed. The approximation operation may have the limited number of repetitions. The approximation operation may include applying constant τ representing an approximation degree to DNN output A.

In S530, resource allocation matrix X having a permutation matrix form may be acquired as a result of an approximation operation. The approximation operation may be applied as an activation function of a last layer of a neural network (i.e., the whole neural network including a DNN and an approximation operation) deriving resource allocation matrix X. A process of acquiring resource allocation matrix X may be performed with an optimization process of other element (e.g., transmission power or the whole rate) of a wireless communication system.

In S540, resource allocation may be performed based on resource allocation matrix X. Resource allocation may include allocating M resource elements belonging to a set of first type resources to N resource elements belonging to a set of second type resources. A resource may include a network node (e.g., a base station, a terminal, a relay, etc.) and a radio resource (e.g., a time domain resource, a frequency domain resource, a code domain resource, etc.). A first type and a second type may be the same or different.

For M=N, the approximation operation may be defined and performed through examples described by referring to Equation 1 to Equation 13.

For M<N or M>N, the resource allocation may be performed based on a matrix excluding N−M or M−N columns of the resource allocation matrix X (i.e., the above-described matrix x̃).

Figure 6:
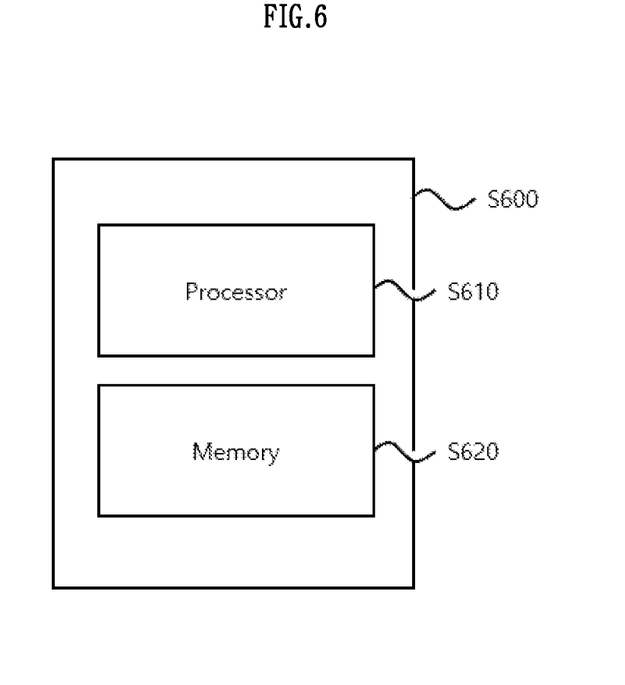
FIG. 6 is a diagram representing a configuration of a resource allocation device according to an example of the present disclosure.

FIG. 6 is a diagram representing a configuration of a resource allocation device according to an example of the present disclosure.

A device 600 may include a processor 610 and a memory 620. A processor 610 of a device 600 may be configured to implement an operation of a resource allocation device in embodiments described in the present disclosure.

For example, a processor 610 of a device 600 may include a neural network operation unit which derives resource allocation matrix X based on wireless channel-related information H. A memory 620 may store and maintain input, output, etc. required for an operation of a processor 610.

A neural network operation unit may include a vectorization module, a DNN module, a reshape module and an approximation operation (e.g., Sinkhorn operator) module by referring to an example of FIG. 1.

For a detailed operation for a training process based on radio channel-related information, the number of various resources, etc. of a neural network operation unit and resource allocation matrix derivation through a trained neural network and others, examples described by referring to FIG. 1, etc. may be applied.

A processor 610 may perform resource allocation which allocates M elements of a set of first type resources to N elements of a set of second type resources based on resource allocation matrix X acquired through a neural network operation unit.

In an operation of a device 600, a description for a resource allocation operation in examples of the present disclosure may be applied equally and an overlapping description is omitted.

Illustrative methods of the present disclosure are expressed as motion series for clarity of a description, but it is not to limit an order that a step is performed and if necessary, each step may be performed simultaneously or in a different order. To implement a method according to the present disclosure, other step may be additionally included in an illustrated step, or remaining steps except for some steps may be included, or an additional other step except for some steps may be included.

A variety of embodiments of the present disclosure do not enumerate all possible combinations, but are to describe a representative aspect of the present disclosure, and matters described in various embodiments may be independently applied or may be applied by at least two combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A scope of the present disclosure includes software or machine-executable commands (e.g., an operating system, an application, a firmware, a program, etc.) which execute an action according to a method of various embodiments in a device or a computer and a non-transitory computer-readable medium that such software or commands, etc. are stored and are executable in a device or a computer.

INDUSTRIAL APPLICABILITY

Examples of the present disclosure may be applied to a resource allocation optimization method in a variety of wireless communication systems.

The invention claimed is:

1. A method of performing resource allocation in a wireless communication system, the method comprising:
acquiring DNN output matrix A through a deep neural network (DNN) based on input matrix H;
directly acquiring resource allocation matrix X having a form of a permutation matrix through an approximation operation to a doubly stochastic matrix with applying the DNN output matrix A as an input; and
allocating M resource elements belonging to a set of first type resources to N resource elements belonging to the set of second type resources based on the resource allocation matrix X,
wherein an input vector $h_{ii}$ of the input matrix H corresponds to a radio wave environment or a connection state between an i-th first type resource of the first type resources and a i-th second type resource of the second resources,
wherein the DNN output matrix A corresponds to N×N-sized matrix reshaped from a DNN output vector a,
wherein, for M=N, $$\sum_{i=1}^{N} x_{ij} = 1, \forall j, \text{ and } \sum_{j=1}^{N} x_{ij} = 1, \forall i,$$

where $x_{ij}$ (i∈ M, i∈ N) corresponds to a binary optimization variable or a discrete allocation variable having a value of 0 or 1, and
wherein, for M>N or N>M.

$$\sum_{i=1}^{N} x_{ij} = 1, \forall j, \text{ and } \sum_{j=1}^{M} x_{ij} \leq 1, \forall i.$$

2. The method according to claim 1, wherein:
the approximation operation has a limited number of repetitions.

3. The method according to claim 2, wherein:
the approximation operation is performed consecutively K times and the consecutively performed operation is repeated L/K times.

4. The method according to claim 3, wherein:
the approximation operation includes applying a constant representing an approximation degree to the DNN output information.

5. The method according to claim 4, wherein:
the approximation operation is S(τA),
τ is the constant representing the approximation degree.

6. The method according to claim 5, wherein:
the approximation operation is applied as an activation function of a last layer of a neural network deriving the resource allocation matrix X.

7. The method according to claim 6, wherein:
a process of acquiring the resource allocation matrix X is performed with an optimization process of other element of the wireless communication system.

8. The method according to claim 5, wherein for M=N:

$$S(A) = \arg\max_{D \in \mathcal{D}_n} tr(A^T D),$$

$D_n$ corresponds to the set of n×n-sized doubly stochastic matrixes,
tr( ) refers to a diagonal sum,
S( ) includes repetition of row-wise normalization and column-wise normalization,
D is the doubly stochastic matrix,
$d_{ij}$, elements of D, satisfies $$\sum_{i=i}^{n} d_{ij} = 1, \sum_{j=1}^{n} d_{ij} = 1, 0 \le d_{ij} \le 1.$$

9. The method according to claim 8, wherein:

S( ) is defined by $$S^0(A) \triangleq \exp(A), S^m(A) = C(R(S^{m-1}(A))),$$

R( ) corresponds to the row-wise normalization,

C( ) corresponds to the column-wise normalization, they are defined by $$R(A) \triangleq \{\tilde{a}_{ij}, \forall i, j\}, \tilde{a}_{ij} = \frac{a_{ij}}{\sum_{k=1}^{n} a_{ik}},$$

$$C(A) \triangleq \{\hat{a}_{ij}, \forall i, j\}, \hat{a}_{ij} = \frac{a_{ij}}{\sum_{k=1}^{n} a_{kj}}.$$

10. The method according to claim 5, wherein for M>N or N>M:

a matrix excluding N–M or M–N columns of the resource allocation matrix X is defined as a modified resource allocation matrix, the resource allocation step is performed based on the modified resource allocation matrix.

11. A device performing resource allocation in a wireless communication system, the device comprising:

a memory; and a processor, wherein the processor is configured to:
  acquire DNN output matrix A through a deep neural network (DNN) based on input matrix H;
  directly acquire resource allocation matrix X having a form of a permutation matrix through an approximation operation to a doubly stochastic matrix with applying the DNN output matrix A as an input; and
  allocate M resource elements belonging to a set of first type resources to N resource elements belonging to the set of second type resources based on the resource allocation matrix X, wherein an input vector $h_{ii}$ of the input matrix H corresponds to a radio wave environment or a connection state between an i-th first type resource of the first type resources and a i-th second type resource of the second type resources, wherein the DNN or put matrix A corresponds to a N×N-sized matrix reshaped from a DNN output vector a, wherein, for M=N, $$\sum_{i=1}^{N} x_{ij} = 1, \forall j, \text{ and } \sum_{i=1}^{N} x_{ij} = 1, \forall i,$$

where $x_{jj}$ (i∈M, j∈N) correspond to a binary optimization variable or a discrete allocation variable having a value of 0 or 1, and wherein, for N<M or M<N, $$\sum_{i=1}^{N} x_{ij} = 1, \forall j, \text{ and } \sum_{j=1}^{M} x_{ij} \le 1, \forall i.$$

* * * * *